United States Patent [19]

Jung et al.

[11] 4,105,610
[45] Aug. 8, 1978

[54] REACTION PRODUCTS OF POLYDIOLEFINS, PHENOLS AND UNSATURATED CARBOXYLIC ACIDS

[75] Inventors: Albert Jung, Taunusstein; Kurt Hultzsch, Wiesbaden-Biebrich; Rolf Zimmermann, Wiesbaden-Sonnenberg; Johannes Reese, Wiesbaden-Biebrich, all of Germany

[73] Assignee: Hoechst Aktiengesellschaft, Frankfurt, Germany

[21] Appl. No.: 651,530

[22] Filed: Jan. 22, 1976

Related U.S. Application Data

[63] Continuation of Ser. No. 422,565, Dec. 6, 1973, abandoned.

[30] Foreign Application Priority Data

Nov. 26, 1973 [DE] Fed. Rep. of Germany ....... 2358722
Nov. 20, 1973 [DE] Fed. Rep. of Germany ....... 2357762
Dec. 9, 1972 [DE] Fed. Rep. of Germany ....... 2260376

[51] Int. Cl.$^2$ .................. C08L 93/00; C08F 8/46
[52] U.S. Cl. .................. 260/27 BB; 260/874
[58] Field of Search .................. 260/47 UP, 62, 887, 260/894, 57 R, 27 BB; 528/130, 136, 177, 205; 526/19, 20, 21

[56] References Cited

U.S. PATENT DOCUMENTS

| | | | |
|---|---|---|---|
| 2,608,550 | 8/1972 | Rowland et al. | 260/27 BB |
| 3,110,699 | 11/1963 | Schmitz-Josten | 260/62 |
| 3,258,450 | 6/1966 | Aronoff | 260/62 |
| 3,324,197 | 6/1967 | Schwarzer | 260/57 R |
| 3,654,203 | 4/1972 | Parm et al. | 260/27 BB |
| 3,770,688 | 11/1973 | Hamonn | 260/47 UP |
| 3,880,788 | 4/1975 | Rudolphy | 260/27 BB |
| 3,893,967 | 7/1975 | Lunde-Glassman | 260/47 UP |
| 3,935,145 | 1/1976 | Rudolphy | 260/27 BB |
| 3,943,086 | 3/1976 | Schein et al. | 260/887 |
| 4,025,479 | 5/1977 | Jung et al. | 260/27 BB |

*Primary Examiner*—Joseph L. Schofer
*Assistant Examiner*—Peter F. Kulkosky
*Attorney, Agent, or Firm*—Littlepage, Quaintance, Murphy, Richardson and Webner

[57] ABSTRACT

A reaction product of a diolefine polymer with a phenol and an olefinically unsaturated carboxylic acid or its anhydride wherein the diolefine polymer is (a) a homopolymer of a diene having 4 to 10 carbon atoms,
(b) a copolymer of at least two dienes of (a),
(c) a copolymer of at least one diene of (a) with a minor molar amount of at least one copolymerizable monomer,
(d) a combination of at least two of (a) to (c)

wherein the amount of phenol is in the range from 2 to 40% by weight and the amount of the unsaturated carboxylic acid or its anhydride is in the range from 2 to 55% by weight, always referred to the starting polymer, a process for the preparation of said product wherein (a) a homopolymer of a diene having 4 to 10 carbon atoms,
(b) a copolymer of at least two dienes of (a),
(c) a copolymer of at least one diene of (a) with a minor molar amount of at least one copolymerizable monomer,
(d) a combination of at least two of (a) to (c),
(e) polymerizable unsaturated monomers being the base for one of polymers (a) to (c) either alone or in admixture are polymerized and at the same time the reaction mass is reacted in one step with an amount of phenol sufficient to cause a content of bound phenol groups in the range from 2 to 40%, and with 2 to 55% by weight of (h) an unsaturated carboxylic acid, (i) an anhydride thereof or (k) of a combination of (h) and (i), referred to the starting polymer, and wherein unreacted phenol is subsequently eliminated and a binding agent comprising said product.

29 Claims, No Drawings

REACTION PRODUCTS OF POLYDIOLEFINS, PHENOLS AND UNSATURATED CARBOXYLIC ACIDS

This is a continuation of application Ser. No. 422,565, filed Dec. 6, 1973, which is now abandoned.

This invention relates to reaction products of diolefin polymers with phenols and olefinically unsaturated carboxylic acids or their anhydrides and to processes for the preparation thereof.

It is known that under the action of strong acids or Friedel Crafts catalysts olefins can be added to phenols in the ortho- and/or para-positions as well as to the hydroxy group itself with ether formation. Depending on the reaction conditions in certain circumstances diolefins can add on at both double bonds. In addition reaction products of diolefin polymers with phenol are known.

Maleate oils can be produced by reacting maleic anhydride with unsaturated natural oils, such as wood oil and linseed oil. In the same way maleic anhydride can be reacted under the influence of heat with terpenes, unsaturated hydrocarbon resins and polybutadiene oils. The production of polybutadiene oil/maleic anhydride adducts is often difficult because gelling can easily occur particularly if more than 3% of maleic anhydride is added. It is indeed possible to reduce or even prevent gelling by using various additives such as hydroquinone, Ionol i.e. 2,6-di-tert.-butyl-4-methyl-1-phenol, copper powder, copper naphthenate or complexing agents, but this is disadvantageous due to the high price of the chemicals and the additional working stages necessary e.g. removing the additives. In addition, the products are usually darkened by the additives or their properties are impaired.

According to a known process mineral oil resins and phenol formaldehyde resins are reacted together in the presence of unsaturated carboxylic acids or anhydride such as maleic anhydride and the products obtained therefrom are used as binders for printing inks and paints. In this process it is firstly necessary to prepare a phenol resin with the desired specific characteristics which is only reacted further in the second stage. Since the reactive positions of the phenol nuclei in the starting phenol resin are substantially occupied as a result of the formaldehyde condensation the phenol resin can substantially only react with the mineral oil resin at the methylol groups. Consequently the phenol nuclei cannot be added to the double bonds of the starting mineral oil resin.

It has now been found that phenols, olefinically unsaturated carboxylic acids and anhydrides and polydiolefins can be reacted together in a single stage to yield products suitable as binders for printing inks, adhesives and paints.

Thus according to one feature of the present invention there is provided the reaction product of a phenol component, an olefinically unsaturated carboxylic acid component comprising an olefinically unsaturated monocarboxylic acid containing from 3 to 22 carbon atoms or anhydride therefrom and/or an olefinically unsaturated dicarboxylic acid or anhydride, and a diolefin polymer selected from:

(a) a homopolymer of a diene containing from 4 to 10 carbon atoms, (b) a copolymer of at least two dienes containing from 4 to 10 carbon atoms, (c) a copolymer of at least two dienes containing from 4 to 10 carbon atoms and a less than equimolar proportion of at least one copolymerisable monomer, or (d) a combination of at least two of the above-identified homo- and copolymers, wherein the phenol content is from 2 to 40% by weight, preferably from 3 to 30% by weight, and the content of the olefinically unsaturated carboxylic acid component is from 2 to 55% by weight, preferably from 5 to 30% by weight of the initial diolefin polymer weight.

According to a further feature of the present invention there is provided a process for the preparation of a reaction product as herein described which comprises reacting in a single stage a diolefin polymer as hereinbefore defined with from 2 to 55% by weight, preferably from 5 to 30% by weight of an olefinically unsaturated carboxylic acid component as hereinbefore defined and with a sufficient quantity of a phenol component to provide from 2 to 40%, preferably from 3 to 30% by weight, of bound phenol radicals in the product, all % weights being referred to the initial diolefin polymer weight, and subsequently removing any unreacted phenol from the product.

According to one embodiment of the invention the polymerisable unsaturated monomers serving as the basis for the polymers and polymer mixtures (a) to (d) are polymerised in the reaction mixture which is simultaneously reacted with phenol and with 2 to 55% by weight of an unsaturated carboxylic acid and/or its anhydride based on the starting polymer, and subsequently the unreacted phenol is removed.

The products according to the invention can, for example, be obtained if the polymers are reacted with the olefinically unsaturated carboxylic acids or their anhydrides and, if desired and excess of phenol, optionally in the presence of a maximum of 5% by weight based on the starting polymer of a Friedel-Crafts catalyst or a mineral acid. The unreacted phenol portions as well as any catalyst used are then removed. The reaction can also be performed in the presence of a solvent whereby for example the unreacted phenol can subsequently be removed together with any solvent present. It is thus possible to add the unsaturated acid or its anhydride and phenol even in relatively high quantities to a wide variety of diolefin polymers in a technically simple process. In comparison with the previously known processes there is no partial or complete gel formation. Further the additives conventionally used in thermal maleic anhydride additions are unnecessary.

The polydiolefin preferably has a relatively low average molecular weight. The term "relatively low molecular weight" when used herein refers to polymers with an average molecular weight of up to 15,000 preferably 600 to 10,000. Preferably the polymers have an average molecular weight of at least 300. If the products are to have the properties of hard resins generally polymers with an average molecular weight of from 500 to 5000 are used as starting materials. If soft polymers are desired starting polymers with an average molecular weight of up to 1,400 are preferred. It is sometimes however also possible to use polymers with higher molecular weights e.g. up to 100,000.

In the reaction products according to the invention the phenol groups are bound to the polydiolefins at the ortho- and/or para-positions to the phenolic hydroxy group. In addition some of the phenol radicals can be bound via ether linkages to C-atoms of the polymer, as proved for example by IR analysis.

The products obtained from low molecular weight polymers are sometimes still partly unsaturated depending on the quantity of phenol added and unsaturated acids or their anhydrides can therefore undergo further addition and/or polymerisation reactions. The unsaturated acid or anhydride e.g. maleic anhydride can be added in various ways to the double bonds not used up by addition to phenol e.g. by means of Diels Alder reactions and/or also by means of a simple addition reaction of the olefinic double bonds of the acid to the olefinic double bonds of the polydiolefin. In addition the carboxyl groups can add across the polydiolefin double bonds with or without catalysts. Residual double bonds of the polymers can also be used up by cyclisation reactions.

As diolefin polymers can be used in addition to 1,4- and 1,2-polybutadiene, polyisoprene polymers of cycloaliphatic dienes with 5 to 10 C-atoms, such as cyclopentadiene, methylcyclopentadiene, dicyclopentadiene, cyclohexadiene and cycloheptadiene.

The copolymerisable monomers are preferably singly olefinically unsaturated. Of the multiply unsaturated compounds those with at least two allyl groups are preferred particularly those with two. Suitable copolymerisable monomers include for example styrene, α-methylstyrene, the various vinyl toluenes, acrylic acid and methacrylic acid or their derivatives such as esters, amides and nitriles, as well as vinylpyridine, allyl compounds, such as diallylphthalate and unsaturated compounds of petroleum fractions e.g. mixtures of unsaturated hydrocarbons particularly those having an average carbon atom content of from 5 to 9 C-atoms e.g. piperylene or indene.

Mono-olefins with a boiling temperature in the range 20° to 190° C are preferred as copolymerisable monomers.

Preferred copolymers are those derived from $C_4$- to $C_9$-conjugated dienes particularly $C_5$- and/or $C_9$-dienes, and dicyclopentadiene. Preferred copolymers according to the invention are for example butadiene-dicyclopentadiene copolymers, styrene-dicylcopentadiene copolymers, butadienecyclopentadiene-vinyltoluene copolymers, dicyclopentadieneisoprene copolymers, butadiene-styrene copolymers and isoprenestyrene copolymers.

Suitable phenols according to the invention include mono- and polyvalent, mono- and polynuclear, substituted and unsubstituted phenols, such as phenol, alkylphenols, e.g. the various cresols, xylenols, butyl- and nonylphenols, chlorophenols, styrenated phenols, resorcinol, naphthols, diphenylolmethanes, diphenylolpropanes and novolaks, as well as esterified or etherified phenols, such as anisole, and other phenol derivatives, such as phenol carboxylic acids.

Advantageously the reaction takes place with an excess of phenol based on the diolefin polymer weight. It can however also take place with the calculated amount.

The olefinically unsaturated carboxylic acid component comprises appropriately, for example dicarboxylic acids, such as maleic, fumaric, citraconic, mesaconic and itaconic acid, and mixtures thereof as well as their anhydrides, whereby maleic anhydride is preferred.

According to one embodiment of the invention the reaction products may contain in place of or in addition to the unsaturated dicarboxylic acids or their anhydrides, olefinically unsaturated monocarboxylic acids containing from 3 to 22, preferably from 3 to 18 C-atoms or their anhydrides. Reaction products modified by the presence of these unsaturated monocarboxylic acids and anhydrides are characterised by a particularly light colour which is retained in solution and by a substantial uniformity in their molecular weight. By incorporating monocarboxylic acids, particularly if they are bound as ester groups, the polarity of the products is increased and leads to a better behaviour relative to pigments.

Suitable unsaturated monocarboxylic acids include for example acrylic acid, methacrylic acid, phenylacrylic acid, crotonic acid, isocrotonic acid, vinylacetic acid, angelic acid, tiglic acid, sorbic acid, undecyclic acid, fatty acids of drying or semi-drying oils, such as oleic acid, caster oil fatty acid (the fatty acid obtained from dehydrated caster oil), elaidic acid, eleostearic acid, erucaic and brassidic acid. Mixed anhydrides can be used as the unsaturated carboxylic acid component.

If both unsaturated monocarboxylic and dicarboxylic acids and/or their anhydride are to be reacted with the diolefin they can be added simultaneously or separately.

It is also possible for the reaction products according to the invention to contain saturated aromatic and/or araliphatic carboxylic acids with at least 3 C-atoms. Thus, for example, mono- and/or polycarboxylic acids as well as their substitution products such as hydroxycarboxylic acids and halogenocarboxylic acids and/or their derivatives e.g. anhydrides and esters including partial esters, can be added to the reaction mixture but only however in small quantities. Suitable saturated and/or aromatic acids include for example those with up to 18 C-atoms, such as propionic, butyric, caproic, heptanoic, isononanoic, decanoic, dodecanoic, lauric, palmitic, stearic, malonic, succinic, adipic, chloroacetic, glycollic, lactic, citric, phenylacetic, phthalic, isophthalic, terephthalic, trimellitic, and pyromellitic acids. These acids may be added in each case singly or in admixture. Appropriately their proportion represents a maximum of 20% by weight based on the total weight of the unsaturated carboxylic acid component. Products modified with saturated carboxylic acids are particularly advantageous if it is desired to reduce the degree of unsaturation of the end products or to increase the number of acid groups bound as esters and therefore the number of functional groups. It is found that the presence of saturated carboxylic acids increases the solubility of the products in certain solvents e.g. aliphatic hydrocarbons and extends the compatibility range with other resin groups.

The weight ratio of the phenol component to the unsaturated carboxylic acid component in the starting mixture is advantageously from 1:28 to 20:1, preferably from 1:9 to 9:1, in particular 7:3 to 3:7.

When used any catalyst can for example be removed by precipitation and/or neutralisation and/or by washing out. The separation of the catalyst can also take place by neutralisation and subsequently filtration or washing out. If sulphuric acid or sulphonic acids are used the separation can also take place in per se known manner by reduction e.g. to sulphur dioxide ($SO_2$) by means of the polymer.

Suitable catalysts include for example Friedel Crafts catalysts, e.g. metal compounds, such as halides, e.g. aluminium and zinc chloride or tin tetrachloride, as well as borontrifluoride or its complexes, such as borontrifluoride etherate or borontrifluoride phenol, mineral acids, such as phosphoric acid, hydrochloric acid and preferably sulphuric acid and sulphonic acids, such as phenol sulphonic acid, p-toluene sulphonic acid or xylene sulphonic acids. The catalyst is generally present during the reaction in a proportion of at least 0.2% preferably up to 2%, by weight based on the diolefin polymer. It is advantageous to use a relatively small quantity of catalyst since the catalyst can be more easily removed and the preparation of the products causes less corrosion problems than when using larger quantities of catalyst.

The reaction of the phenol component and the unsaturated mono- or dicarboxylic acid or anhydride, for example maleic anhydride, with the polymers can take place in various ways, for example in solution or in the melt and generally at temperatures of 20° to 220° C, preferably 40° to 150° C, particularly at 120° C. The polymer can be mixed or fused with the phenol and the acid or anhydride and subsequently mixed with the catalyst. It is also possible to first mix the phenol, the acid or the anhydride and the catalyst and to subsequently add the polydiolefin, particularly when using liquid polymers. When the reaction has been completed under appropriate temperature and pressure conditions any excess phenol is removed e.g. by distillation under normal or reduced pressure.

According to a preferred embodiment, formaldehyde is added to the reaction mixture before, during or after the reaction and is condensed therewith. Hereagain it is possible to work in the presence of or in the absence of catalysts. The molar ratio of incorporated phenol to incorporated formaldehyde is generally from 1:(0.2 to 3.5), or 1:(0.2-0.8) or 1:(0.8-1.8), preferably from 1:(0.2 to 1.8).

It was previously thought that formaldehyde could generally only be incorporated into phenol resins in a proportion of up to about 2 mol per mol of phenol. However according to the present invention there are provided phenol resins containing up to 40% by weight of incorporated phenol and containing a higher proportion of formaldehyde per mol of phenol. The formaldehyde can react in other ways as well as with the phenolic component. Thus, for example, the reactive methylol groups derived from the formaldehyde can also undergo reactions with the diolefin polymers and/or unsaturated terpenes such as colophony present in the starting mixture.

The process according to the invention has the following advantages: Light products are obtained in good yield and with much higher proportions of phenol and unsaturated carboxylic acid components, particularly maleic anhydride, than in the hitherto known processes according to which only phenol or only maleic anhydride could be added to the resin. Surprisingly no gel formation occurs. Concomitantly used catalysts can be separated from the reaction mixture without difficulty. Since the quantity of catalyst is very small it can sometimes be allowed to remain in the reaction product if the small amount does not have a disadvantageous effect depending on the intended use of the products.

The embodiment of the inventive process according to which unsaturated monocarboxylic acids or their anhydrides are used has the advantage that the reaction can be performed under milder conditions i.e. at lower temperatures and the unreacted volatile component can be removed more easily. As a result undesired polymerisation and therefore viscosity rises can be avoided.

The reaction products have the further advantage that their content of phenol or unsaturated acids or anhydrides, for example their maleic anhydride content, can vary within a wide range. They can simultaneously also have a high content of phenol and acids or anhydride which can e.g. be determined by IR spectrographic analysis whereby however the above-indicated figures are always calculated with reference to the starting polymer.

A further advantage of the formaldehyde-containing reaction products is that the products can be prepared without isolation of intermediates. In this way it is also possible to obtain products with a high content of incorporated phenol. This is made possible by firstly condensing formaldehyde with those phenol nuclei which were first added to the diene polymer. Via the methylol groups formed from the formaldehyde it is now possible to partially condense further quantities of phenol. This leads to an increase in the number of phenolic hydroxy groups and reactive positions on the phenol nuclei at which further components can be introduced. In addition the solubility of the products in various solvents as well as the compatibility with a series of other resins or resin combinations can be varied leading to a wider utilisation of the products according to the invention.

The viscosity of the products can vary within a very wide range. For example the products can be liquids of high or low viscosity or even solid. Generally the viscosity rises with increasing content of the phenols and carboxylic acids or anhydrides. The hydroxy and acid numbers can vary within wide limits. By adjusting the polarity the solubilities in polar and non-polar solvents can be controlled. With increasing hydroxy number the products have an increasing compatibility with other phenolic resins. The products according to the invention are much more stable to atmospheric oxidation as well as thermal stressing than the known phenol or maleic anhydride adducts. In addition they have improved solubilities and compatibilities with a wide variety of resin groups. In addition the melting points of the products according to the invention can be varied according to the phenol, formaldehyde and carboxylic acid or anhydride content. For example the melting points of the products can be increased as desired, up to about 240° C increasing the proportion of dicarboxylic acids or their anhydrides or of monocarboxylic acids with up to 4 C-atoms. It is also possible to lower the melting point by incorporating longer chained unsaturated monocarboxylic acids.

The reaction products according to the invention can be partially unsaturated and have iodine numbers exceeding 100. Consequently they can undergo further addition and/or polymerisation and/or cyclisation reactions.

The products according to the invention are elastic, soluble in solvents such as aliphatic aromatic hydrocarbons chlorinated hydrocarbons such as trichlorethylene, carbon tetrachloride, chlorobenzene, as well as in ethyl acetate and chloroform. The solubilities are adjustable by means of the incorporated phenol and acid or anhydride content. The products according to the invention are for example good binders for coatings, adhesives and printing inks, but by modifying them, e.g. by esterification of the carboxy groups formed by hydrolysis of the anhydrides with mono- and/or polyhydric alcohols or by salt formation, they can be used for other purposes. Coatings produced from the products have a good lustre, adhesion, bending strength, wear-resistance and an excellent compatibility with pigments. In particular products with a high phenol content have a high resistance to yellowing during stoving. The lower viscosity products in particular e.g. those with a phenol content of 3 to 20% by weight and a content of unsaturated carboxylic acids or anhydrides of 5 to 35%, and in particular a maleic anhydride content of 5 to 25, preferably up to 20% by weight, are suitable for use in paints. Products with a phenol content of 5 to 30% preferably up to 25% by weight, particularly at least 10% by weight and a content of unsaturated carboxylic acids, particularly unsaturated dicarboxylic acids or anhydrides, preferably maleic anhydride, of at least 5%, preferably 15 to 30% by weight (percentage figures are always based on the starting polymer) are particularly suitable as printing ink binders. Products with a high phenol content of even above 30% by weight and a high content of dicarboxylic acid or the anhydride thereof or monocarboxylic acids with up to 4 C-atoms, particularly maleic anhydride, are suitable as water-soluble paints due to the saponifiable groups.

The products according to the invention both during their formation and as a result of subsequent reaction can be modified e.g. with terpene compounds such as colophony and/or fatty oils. The addition of these substances can take place before, during or after the main reaction. The products can also contain at least one unsaturated terpene compound such as pinene, dipentene or the like, preferably resinic acids e.g. colophony. In addition the phenolic hydroxy group can be esterified (e.g. with acetic anhydride) or etherified (e.g. by reacting with an alkylene oxide such as epichlorohydrin). It is also possible to react the excess of phenol with formaldehyde or harden the resin with hexamethylene tetramine or react it with resols. At the free positions of the phenol nucleus it is also possible to perform substitution reactions e.g. aryl or alkyl and/or aralkyl groups, such as methyl, ethyl, propyl, isononyl and phenylethyl groups can be introduced. Styrene or compounds with unsaturated groups such as alkenyl groups e.g. the nonenyl group may also be added to the phenol nucleus as well as halogen atoms such as chlorine and bromine.

The products obtained by reacting with formaldehyde or epichlorohydrin are generally hardenable e.g. with amines or acid anhydrides. Mixed adducts with terpenes, particularly natural resinic acids are very well suited for the above applications.

In the following Examples all % are % by weight. Unless otherwise stated the viscosity is measured at 20° C in a 50% toluene solution.

EXAMPLES (1) 0.4 g of 100% phenol sulphonic acid are added at 50° C to a mixture of 240 g of cis-1.4-polybutadiene oil, 480 g of phenol and 40 g of maleic anhydride. The reaction mixture immediately darkens.

After maintaining the mixture for 1 hour at 90° C, it is continuously heated for 3 hours to 180° C and left at this temperature for 3 hours. During this time the reaction mixture becomes light-coloured. The unreacted phenol is distilled off under heating up to 220° C. The residual phenol is removed under reduced pressure (60 mm Hg). 318 parts of a light yellow, tough plastic resin having a viscosity of 177 cP and containing about 40 g of bound maleic anhydride and 38 g of bound phenol are obtained. After stoving, these products give varnish films showing good adhesion and bending strength.

(2) 0.3 g of 100% phenol sulphonic acid are added at 90° C to a mixture comprising 100 g of 1.2-polybutadiene oil, 300 g of phenol and 17 g of maleic anhydride, whereby the reaction mixture turns dark. It is maintained for 1 hour at 90° C, then continuously heated within 2 hours up to 180° C and left at this temperature for 3 hours. The temperature is increased to 220° C in order to distill off the excess of phenol. To remove the residual phenol the mixture is heated under reduced pressure (60 mm Hg). 138 parts of a yellow, clear, hard resin having a melting point of 162° C and a viscosity of 2510 cP, containing 17 g of bound maleic anhydride and 21 g of bound phenol, are obtained.

(3) 0.2 g of 100% phenol sulphonic acid are added at 50° C to a mixture comprising 120 g of cis-1,4-polybutadiene oil, 240 g cP phenol and 40 g of maleic anhydride. Heating takes place during 4 hours at 180° C, whereby the dark coloured reaction mixture becomes lighter. The mixture is maintained for 3 hours at this temperature and the unreacted phenol is then distilled off at 220° C, first under normal pressure and finally under reduced pressure (60 mm). 173 g of a clear, yellow brown, comminutable, hard resin having a melting point of 48° C, containing 40 g of bound maleic anhydride and 13 g of bound phenol, are obtained. After neutralization with ammonia or amines, the resin is dilutable with water.

(4) At 90° C 0.15 g of boron trifluoride-phenol are added to a mixture comprising 120 g of cis-1,4-polybutadiene oil, 240 g of phenol and 20 g of maleic anhydride, whereby the mixture becomes slightly dark-coloured. It is maintained for 10 minutes at 90° C and then continuous heating takes place for 75 minutes at 180° C. While the mixture is maintained for 4 hours at this temperature a gentle stream of carbon dioxide is passed over. The unreacted phenol is then distilled off at 220° C under normal pressure and finally under reduced pressure (60 mm). 141 g of yellow, high-viscous resin remain. Products of this kind are suitable as adhesive resins for polychloroprene and polyurethane adhesives.

(5) 8 g of maleic anhydride are added at 70° C to 100 g of a liquid polyisoprene dissolved in 200 g of phenol. Subsequently 1 g of 100% phenol/sulphonic acid is added at 90° C. Under the exothermic reaction the reaction mixture becomes dark-coloured. It is kept for 1 hour at 120° C, then heated continuously for 3 hours to 180° C, maintained at this temperature for a further 3 hours and finally the excess of phenol is distilled off at 220° C, under reduced pressure towards the end of the distillation. 118 g of a clear, amber-coloured resin having a melting point of 83° C and a viscosity of 25 cP are obtained. The product contains 8 g of bound maleic anhydride and 10 g of bound phenol.

(6) 250 g of cis-polyisoprene are added to a mixture heated to 160° C comprising 300 g of phenol and 5 g of maleic anhydride. Within 5 hours 2.5 g of concentrated sulphuric acid are added dropwise, whereby the polyisoprene is gradually dissolved. Under continuous heating to 260° C the unreacted phenol is distilled off, under reduced pressure (60 mm) towards the end of the distillation. 266 g of cyclized rubber modified with maleic acid groups in the form of a clear, light yellow resin having a melting point of 130° C and a viscosity of 3460 cP are obtained. Content of maleic anhydride: 5g, phenol content 11g. The products are suitable for the preparation of printing inks.

(7) 300 g of phenol heated to 160° C are first combined with 1.3 g of zinc chloride, then with 15 g of maleic anhydride and finally with 250 g of cis-polyisoprene. After a short time the reaction mixture becomes dark-coloured. After dissolution of the polyisoprene within 4 hours, the zinc chloride is precipitated by addition of 2.7 g of soda and separated by filtration. The excess of phenol is removed from the filtrate by distillation at 220° to 260° C, under reduced pressure (60 mm) towards the end of the distillation. In a yield of 283 g a cyclized rubber modified with maleic groups in the form of an amber-coloured resin having a melting point of 148° C and a viscosity of 592 cP is obtained which is suitable for printing inks. Content of maleic anhydride 15 g, phenol content 18 g.

(8) 400 g of phenol are heated up to 160° C. First 15 g of maleic anhydride and then 250 g of an isoprene-styrene copolymer are added dropwise within 4 hours. The mixture is maintained for 3 hours at 180° C and the temperature is subsequently increased to 260° C. The excess of phenol is distilled off simultaneously. The residual amounts of phenol are removed under reduced pressure. 274 g of a light yellow hard resin having a melting point of 175° C and a viscosity of 289 cP are obtained. Content of maleic anhydride 15 g, phenol content 9 g.

(9) At 90° C 1 g of 100% phenol sulphonic acid is added to a mixture comprising 120 g of phenol, 5 g of maleic anhydride and 50 g of a liquid copolymer of isoprene and vinyltoluene in a weight ratio of 40:60. The mixture darkens immediately under the exothermic reaction. Cooling to 90° C takes place during 1 hour. The mixture is then heated to 110° C and maintained for 2 hours at this temperature. Within 5 hours it is continuously heated up to 180° C and kept for 3 hours at this temperature. The excess of phenol is removed by heating to 220° C and reducing the pressure (60 mm) towards the end of the distillation. 61 g of yellow orange, clear resin having a melting point of 100° C and a viscosity of 101 cP are obtained. Content of maleic anhydride 5 g, phenol content 6 g.

(10) At 90° C g of 100% phenol sulphonic acid is added to a mixture comprising 120 g of phenol, 5 g of maleic anhydride and 50 g of a liquid popolymer of isoprene, styrene and α-methylstyrene in a weight ratio of 60:20:20. Under the exothermic reaction the mixture turns dark. The reaction being completed the mixture is maintained for 1 hour at this temperature and for 2 hours at 110° C. In the course of 5 hours heating takes place continuously up to 180° C and this temperature is maintained for 3 hours. The unreacted phenol is distilled off at 220° C, finally under reduced pressure (60 mm). 63 parts of an orange yellow, clear resin having a melting point of 61° C and a viscosity of 35 cP are obtained. Content of maleic anhydride 5 g, phenol content 8 g. In the place of the isoprene, styrene, α-methylstyrene copolymer, a copolymer of butadiene, styrene and α-methylstyrene may be used resulting in a product with good properties.

(11) 0.5 g of 100% phenol sulphonic acid are added at 90° C to a mixture comprising 200 g of phenol, 20 g of maleic anhydride and 100 g of a copolymer of dicyclopentadiene and styrene in a weight ratio of 70:30. Under the strongly exothermic reaction the mixture turns dark. With 90 minutes it is heated continuously to 180° C and maintained for 3 hours at this temperature. The reaction mixture becomes essentially lighter-coloured. The excess of phenol is distilled off at 220° C, finally under reduced pressure (60 mm). A light brown, clear resin having a melting point of 104° C and a viscosity of 76 cP with a yield of 136 g is obtained. The product contains 20 g of bound maleic anhydride and 16 g of bound phenol. It is suitable as an adhesive resin.

(12) 1.5 g of 100% phenol and sulphonic acid are added at 90° C to a mixture comprising 200 g of phenol, 30 g of maleic anhydride and 100 g of a copolymer of 90 g of dicyclopentadiene and 10 g of pinene. The reaction mixture turns dark under the strongly exothermic reaction. Cooling takes place from 130° C to 110° C where the mixture is maintained for 4 hours. In the course of 2 hours it is heated up to 180° C and kept for 2 hours at this temperature. Subsequently the excess of phenol is removed at 220° C, towards the end of the distillation under reduced pressure (60 mm). 166 g of a reddish brown resin having a melting point of 165° C and a viscosity of 3 340 cP are obtained. The product contains 30 g of bound maleic anhydride and 36 g of bound phenol, which product is suitable for printing inks.

(13) 1.5 g of 100% phenol sulphonic acid are added at 90° C to a mixture comprising 200 g of phenol, 70 g of maleic anhydride and 100 g of a copolymer of 90 g of dicyclopentadiene and 10 g of colophony. An intense dark coloration is the result of the strongly exothermic reaction. The mixture is maintained for 1 hour at 120° C and subsequent heating takes place continuously for 1 hour up to 180° C. After 3 hours at 180° C the unreacted amount of phenol is distilled off at 220° C first under normal pressure and towards the end of the distillation under reduced pressure (60 mm). 149 g of a clear, brown resin having a melting point of 167° C and a viscosity of 1 110 cP are obtained. The product contains 20 g of bound maleic anhydride and 29 g of bound phenol. It is a suitable resin for printing inks.

(14) 200 g of a copolymer comprising 30% of pinene and 70% of a hydrocarbon fraction of 15% isoprene, 20% piperylene, 25% dicyclopentadiene, 5% butadiene and varying amounts of N- and isopentene and cyclopentene, as well as is oxylene, are mixed with 100 g of phenol 30 g of maleic anhydride and, after heating up to 90° C, 1.5 g of 100% phenol sulphonic acid are then added. The temperature reaches 180° C as a result of the strongly exothermic reaction, and a dark coloration is produced. The mixture is maintained for 3 hours at this temperature and the reaction mixture simultaneously becomes lighter coloured. By heating up to 260° C the unreacted starting materials are distilled off, towards the end of the distillation under reduced pressure (60 mm). 177 g of a brown, clear resin having a melting point of 60° C and a viscosity of 13 cP are obtained.

(15) 200 g of a copolymer comprising 10% of pinene and 90% of a hydrocarbon fraction of 2.7% of styrene, 5.4% of α-methylstyrene. 9.2% vinyltoluene, 14.6% dicyclopentadiene and 21.4% of indene, and still containing aromatic and saturated hydrocarbon, are added to 100g of phenol. 30 g of maleic anhydride are added and, after heating up to 90° C, 1.5 g of 100% phenol sulphonic acid are added. An exothermic reaction with simultaneous darkening of the mixture takes place. The mixture is maintained for 75 minutes at 120° C, then continuously heated for 1 hour up to 180° C, where it is kept during 4 hours and subsequently the unreacted starting materials are distilled off at 260° C, first under normal pressure and then under reduced pressure (60 mm). 177 g of a brown, clear resin having a melting point of 55° C and a viscosity of 13 cP are obtained.

(16) 2 g of 700% phenol sulphonic acid are added to a mixture of 100 g of phenol and 30 g of maleic anhydride. After heating to 80° C 140 g of thermally prepolymerized dicyclopentadiene are added within 1 hour.

Subsequent heating takes place continuously up to 180° C within 4 hours and the mixture is kept at this temperature. for a further 4 hours. After increasing the temperature to 250° C the residual phenol is removed under reduced pressure (60 mm). 226 g of a yellow brown resin having a melting point of 100° C and a viscosity of 62 cP are obtained. Content of maleic anhydride 35 g, phenol content 56 g. The product is suitable as adhesive resin.

(17) 300 g of polymerized dicyclopentadiene are fused with 140 g of phenol. The mixture is heated to 110° C. Subsequently 12 g of paraformaldehyde and 45 g of maleic anhydride are added. Heating takes place for 2 hours up to 180° C where the mixture is kept for 2 hours. Within 30 minutes the temperature is increased to 250° C and finally the unreacted phenol is distilled off under reduced pressure (60 mm). 375 g of an amber-coloured resin having a melting point of 180° C and a viscosity of 460 cP are obtained. Content of maleic anhydride 35 g, phenol content 40 g. The product is a particularly suitable resin for toluene intaglio inks.

(18) A mixture comprising 140 g of phenol, 12 g of paraformaldehyde, 45 g of maleic anhydride and 70 g of acrylic acid are heated to 145° C. Subsequently 300 g of dicyclopentadiene are added dropwise within 3 hours. The mixture is then kept under reflux for 5 hours and finally heated up to 250° C. Residual, unreacted starting materials are removed under reduced pressure (60 mm). 339 g of a yellow-brown resin having a melting point ranging from 93° to 95° C and a viscosity of 254 cP are obtained. Content of maleic anhydride 45 g, phenol content 75.

(19) 900 g of polycyclopentadiene are dissolved under heat in a mixture comprising 143 g of p-tert.-butylphenol and 50 g of xylene. Heating takes then place up to 110° C. First 108 g of maleic anhydride and subsequently 30 g of paraformaldehyde are added to the mixture, which is heated for 3 hours to 180° C and kept there for 30 minutes. Within a further hour the mixture is heated to 250° C, whereby slightly volatile substances are distilled off. Towards the end of the reaction the pressure is reduced (60–80 mm). A yellow brown resin having a melting point of 151° C, a viscosity of 156 cP and an acid number of 37 is obtained in a yield of 1.112 g (=94%). The molar ratio of phenol to formaldehyde is 1:0.95.

(20) 300 g of polycyclopentadiene and 30 g of colophony are dissolved while heating in a mixture comprising 30 g of xylene and 10 g of phenol. At 120° C 45 g of maleic anhydride and 6 g of paraformaldehyde are added. The ratio of phenol to formaldehyde is 1:1.8. During 5 to 6 hours the mixture is heated to 250° C. The reaction mixture is still kept for a short time under reduced pressure (60 mm). 357 g (=98%) of a yellow resin having a melting point of 188° to 194° C and a viscosity of 148 cP are obtained.

(21) 300 g of polycyclopentadiene are dissolved while heating in a mixture comprising 30 g of xylene and 5 g of phenol. At 120° C 36 g of maleic anhydride, and 30 g of acrylic acid and finally 6 g of paraformaldehyde are added. The ratio of phenol to formaldehyde are 1:3.4. Continuous heating takes place for 5 hours up to 250° C and the mixture is finally heated under pressure for 20 minutes at this temperature. 338 g (=90%) of a yellow resin having a melting point of 220° C and a viscosity of 597 cP are obtained.

(22) 300 g of polycyclopentadiene are dissolved in 141 g of phenol at a temperature ranging from 120° to 130° C. A mixture comprising 12 g of phenolformaldehyde (phenol:formaldehyde = 1:0.25) and 45 g of maleic anhydride is then added. Heating takes place for 2 hours up to 180° C and the mixture is maintained for a further hour at this temperature. The mixture is then heated to 250° C and the unreacted starting materials distilled off under reduced pressure (60 mm). 375 g of a yellow brown resin having a melting point of 184° C and a viscosity of 497 cP are obtained.

(23) 1350 g of dicyclopentadiene are polymerized in the presence of 150 g of α-pinene at 230° C under a pressure of 4 atmospheres. A semisolid, yellow paste is obtained. 100 g of this product and 47 g of phenol are heated to 120° C. Simultaneously 15 g of maleic anhydride and 4 g of paraformaldehyde are added. After maintaining the mixture for 30 minutes at 120° C heating takes place for 6 hours to 220° C, the pressure being reduced for the last 30 minutes of the reaction. 145 g (=87.5%) of a yellow resin having a melting point of 76° to 78° C and a viscosity of 70 cP are obtained.

(24) 600 g of polycyclopentadiene and 30 g of colophony are fused with 60 g of phenol. Subsequently 30 g of α-pinene are added and the mixture is heated to 120° C. 72 g of maleic anhydride and then 20 g of paraformaldehyde are added and the mixture is kept for 1 hour at 120° C. It is then heated for 6 to 8 hours at 260° C. After removal of the slightly volatile components by distillation 745 g (=92%) of an amber-coloured resin having a melting point of 145° C and a viscosity of 134 cP are obtained.

(25) 900 g of polycyclopentadiene and 90 g of colophony are dissolved at 120° C in a mixture comprising 90 g of phenol and 90 g of styrene. Subsequently 108 g of maleic anhydride and 30 g of paraformaldehyde are added. After a longer reaction time under reflux the reaction mixture is heated for 6 hours to 250° C and then kept for 30 minutes under reduced pressure (60 mm). 1192 g (=91.5%) of an amber-colored resin having a melting point of 170° –175° C and a viscosity of 144 cP are obtained.

(26) 300 g of polycyclopentadiene and 30 g of cotton seed oil fatty acid are liquefied with 5 g of phenol. At 125° C 36 g of maleic anhydride are added and subsequently 6 g of paraformaldehyde are introduced in small portions. The mixture is heated for 5 hours at 250° C where it is maintained for 30 minutes under reduced pressure. 363 g (=96.5%) of a yellow resin having a melting point of 170° C and a viscosity of 250 cP are obtained.

(27) 300 g of dicyclopentadiene polymer are dissolved with heating in a mixture comprising 141 g of phenol and 50 g of acrylic acid. At 120° C 45 g of maleic anhydride and 12 g of paraformaldehyde are then added and the mixture is heated for 5 hours at 220° C, thereby unreacted phenol is distilled off. Finally the mixture is heated for a further 10 minutes under reduced pressure (60 mm). 486 g (≅81%) of a resin having a melting point of 180° C and a viscosity of 625 cP are obtained.

(28) 300 g of polycyclopentadiene are dissolved in 141 g of phenol and 50 g of methyl methacrylate. At 120° C a mixture of 12 g of paraformaldehyde and 45 g of maleic anhydride are then added. The mixture is heated at 250° C for 6 hours and the excess of phenol is distilled off. 350 g of a yellow-brown resin having a melting point of 192° C and a viscosity of 1250 cP are obtained.

(29) 300 g of polycyclopentadiene are dissolved under heat in a mixture comprising 30 g of xylene and 5 g of phenol. At 120° C first 36 g of maleic anhydride and 30 g of acrylic acid and finally 6 g of paraformaldehyde are added (ratio of phenol to formaldehyde 1:3.4). Subsequently the mixture is continuously heated for 5 hours at 250° C and then heated for 20 minutes under reduced pressure. 338 g (=90%) of a yellow resin having a melting point of 220° C and a viscosity of 597 cP are obtained.

(30) 600 g of polycyclopentadiene and 60 g of colophony are fused in a mixture of 60 g of xylene and 20 g of phenol. Then 120 g of acrylic acid are added. After heating the mixture to 120° C 72 g of maleic anhydride and 6.6 g of paraformaldehyde are introduced. The mixture is now heated to 250° C for 6 hours and towards the end of the reaction heating is continued under reduced pressure (60 mm). 738 g (=84%) of a resin having a melting point of 180° to 185° C and a viscosity of 155 cP are obtained.

(31) 500 g of polycyclopentadiene are dissolved under heat in a mixture comprising 25 g of phenol and 50 g of acrylic acid. After maintaining the mixture for 1 hour at 100° C it is heated continuously under reflux and finally the volatile components are distilled off at 230° C. Towards the end of the reaction heating is continued for 15 to 20 minutes under reduced pressure (approximately 150 to 200 mm). 513 g (=90%) of a yellow-brown resin having a melting point of 110° to 112° C and a viscosity of 32 cP are obtained.

(32) 500 g of a cyclopentadiene polymer are fused in 200 g of phenol and the mixture is heated to 100° C. Subsequently 50 g of acrylic acid are added and first heated under reflux for 6 hours at 200° C, then the excess of phenol is distilled off at 230° C. Finally heating is continued under reduced pressure (60 mm). 539 g (=73%) of a light yellow resin having a melting point of 115° C and a viscosity of 23 cP are obtained. The hydroxyl number is 20 and the acid number 10.

(33) 500 g of polycyclopentadiene are dissolved under heat in 100 g of phenol. At 100° C 50 g of acrylic acid are then added. Subsequently 4 g of paraformaldehyde are introduced. During 7 hours the temperature is increased under reflux to 200° C and then the excess of phenol and the volatile components are distilled off at 230° C. Finally heating is continued under reduced pressure (60 mm). 539 g (=83%) of a yellow-brown resin having a melting point of 110° C and a viscosity of 28 cP are obtained. The hydroxyl number is 20, the acid number 12.

(34) 500 g of a cyclopentadiene polymer are dissolved in 100 g of phenol, then at 100° C 60 g of maleic anhydride and 10 g of acrylic acid are added. The mixture is heated under reflux for 7 hours at 200° C and then volatile components are distilled off at 230° C. Finally heating is continued under reduced pressure (60 mm). 564 g (=84%) of a light brown resin having a melting point of 126° C and a viscosity of 41 cP are obtained.

(35) 500 g of a cyclopentadiene polymer are dissolved in 100 g of phenol. At 100° C 60 g of acrylic acid and 10 g of maleic anhydride are added. Subsequently heating takes place under reflux for 7 hours at 200° C and later volatile components are distilled off at 230° C. Finally heating is continued under reduced pressure (60 mm). 547 g (=82%) of a light yellow resin having a melting point of 122° C and a viscosity of 38 cP are obtained. The hydroxyl number is 8 and the acid number 16.

(36) 900 g of polycyclopentadiene are dissolved in a mixture comprising 90 g of phenol and 90 g of xylene. At 120° C a mixture of 90 g of maleic anhydride and 15 g of adipic acid is then added. Subsequently 30 g of paraformaldehyde are introduced. In the course of 5 to 6 hours the mixture is then heated to 250° C and towards the end of the reaction heating is continued under reduced pressure (100 mm). 1024 g (=92%) of a yellow-brown resin having a melting point of 163° C and a viscosity of 174 cP are obtained.

What we claim is:

1. An ungelled conjoint reaction product derived from a single step reaction of I. a diolefin polymer having a molecular weight up to 100,000 or its components with II. a phenol and III. an olefinically unsaturated carboxylic acid or its anhydride wherein I. is a reaction component selected from the group consisting of
   (a) a homopolymer of a diene having 4 to 10 carbon atoms,
   (b) a copolymer of at least two dienes of (a),
   (c) a copolymer of at least one diene of (a) with a minor molar amount of at least one copolymerisable olefinically unsaturated monomer and
   (d) a combination of at least two of (a) to (c); wherein the amount of phenol is in the range from 2 to 40% by weight and the amount of the unsaturated carboxylic acid or its anhydride is in the range from 2 to 55% by weight, always referred to the starting polymer I.

2. A reaction product as claimed in claim 1 wherein the copolymerisable monomer in component (c) is at least one unsaturated hydrocarbon selected from the group consisting of (e) an unsaturated aromatic hydrocarbon having a boiling point in the range from 20° to 190° C, (f) a mixture of unsaturated aliphatic hydrocarbons having in average 4 to 9 carbon atoms, and (g) a combination of (e) and (f) and wherein at least one of components (a) to (d) has a relatively low molecular weight of up to 15,000.

3. A reaction product as claimed in claim 1 wherein the phenol radicals are bound by their o- or p-position to the carbon atoms of the polymers (a) to (d) and wherein the olefinically unsaturated carboxylic acid is added to those double bonds of the polymers (a) to (d) which bonds have not been reacted with the phenol addition in binding at least one carbon atom of one double bond of the unsaturated hydrocarbon radical of the unsaturated carboxylic acid III) to the polymer.

4. A reaction product as claimed in claim 1 wherein the reaction product is modified by at least one radical selected from the group consisting of methylol, methylene ether and methylene groups derived from a reaction of the phenol component with formaldehyde.

5. A reaction product as claimed in claim 1 wherein the phenol is an at least monohydric, mono- or polynuclear phenol and the unsaturated carboxylic acid is a dicarboxylic selected from the group consisting of maleic acid, maleic anhydride, fumaric acid, and itaconic acid wherein in the starting mixture the weight ratio of the phenol to the unsaturated dicarboxylic acid or the anhydride is in the range from 1:28 to 20:1.

6. A reaction product as claimed in claim 1 also containing at least one unsaturated terpene compound selected from the group consisting of natural rosin acid, colophony, pinene and dipentene.

7. A reaction product as claimed in claim 1 wherein the reaction product also contains formaldehyde being condensed into the reaction product in the single step reaction the molar ratio of the chemically built-in phenol to that of the built-in formaldehyde being 1(0.2 to 3.5).

8. A reaction product as claimed in claim 1 wherein the free carboxylic groups are modified by esterification with a polyhydric alcohol or by salt formation.

9. A process for the preparation of an ungelled reaction product of I. a diolefin polymer having a molecular weight up to 100,000 or of its components with II. a phenol and III. an olefinically unsaturated carboxylic acid or its anhydride wherein I. is a reaction component selected from the group consisting of
   (a) a homopolymer of a diene having 4 to 10 carbon atoms,
   (b) a copolymer of at least two dienes of a),
   (c) a copolymer of at least one diene of a) with a minor molar amount of at least one copolymerisable unsaturated monomer,
   (d) a combination of at least two of a) to c),
   (e) polymerisable unsaturated monomers being the base for one of polymers a) to c) either alone or in admixture are polymerised and at the same time the reaction mass
is reacted in one step at a temperature between 20° and 220° C with II. an amount of phenol sufficient to cause a content of bound phenol groups in the range from 2 to 40%, and with III. 2 to 55% by weight of (h) an unsaturated carboxylic acid or (i) an anhydride thereof, or (k) of a combination of (h) and (i), referred to the starting polymer, and wherein the phenol component II. is reacted in an amount of from 31 to 300% referred to component I. and unreacted phenol is subsequently eliminated.

10. A process as claimed in claim 9 wherein the reaction is performed in the presence of a catalyst which is subsequently eliminated.

11. A process as claimed in claim 9 wherein the reaction is performed at a temperature in the range from 20° to 220° C.

12. A process as claimed in claim 9 wherein prior to, during or after the reaction with the phenol a terpene compound is also reacted.

13. A process as claimed in claim 9 wherein the unsaturated carboxylic acid or its anhydride is a dicarboxylic acid which is at least partially replaced by at least one olefinically unsaturated monocarboxylic acid having 3 to 22 carbon atoms or its anhydride.

14. A process as claimed in claim 9 wherein together with the unsaturated carboxylic acid or its anhydride at least one saturated carboxylic acid having at least 3 carbon atoms or its anhydride is reacted in an amount of at most 20% by weight, referred to the total amount of the unsaturated carboxylic acids or their anhydrides.

15. A binding agent comprising a reaction product as claimed in claim 1.

16. The reaction product of claim 1, in which said carboxylic acid is a dicarboxylic acid.

17. A reaction product as claimed in claim 16 wherein the unsaturated dicarboxylic acid or its anhydride is at least partially replaced by at least one olefinically unsaturated monocarboxylic acid having 3 to 22 carbon atoms or its anhydride either alone or in admixture.

18. A reaction product as claimed in claim 16 wherein at least one saturated mono- and/or polycarboxylic acid having at least 3 carbon atoms or its anhydride is additionally present in an amount of at most 20% by weight, referred to the total of unsaturated carboxylic acids or their anhydrides.

19. The reaction product of claim 1, in which said copolymerisable monomer is selected from the group consisting of styrene, α-methylstyrene, vinyltoluene, acrylic acid, methacrylic acid and derivatives of said acids in the form of their esters, amides and nitriles, vinylpyridines, allyl compounds, and mixtures of unsaturated hydrocarbons having an average of 4 to 9 carbon atoms.

20. The reaction product of claim 6 in which the terpene is pinene.

21. The reaction product of claim 1 in which I. the diolefin polymer is derived from a diolefin of 4 carbon atoms, II. the phenolic reactant is phenol, and III. the unsaturated carboxylic is maleic acid.

22. The reaction product of claim 1 in which I. the diolefin polymer is derived from a diolefin of 5 carbon atoms, II. the phenolic reactant is phenol, and III. the unsaturated carboxylic is maleic acid.

23. A process as claimed in claim 9, wherein prior to, during or after the reaction with the phenol formaldehyde is also reacted.

24. The reaction product of claim 1, in which said carboxylic acid is an olefinically unsaturated monocarboxylic acid containing from 3 to 22 carbon atoms or an anhydride therefrom.

25. The process of claim 9, in which said carboxylic acid is an olefinically unsaturated monocarboxylic acid containing from 3 to 22 carbon atoms or an anhydride therefrom.

26. The process of claim 9, wherein the phenol component II. is reacted in an amount of from 120 to 300% by weight, if it is based on aliphatic dienes or from 31 to 71.5%, if it is based on cycloaliphatic dienes, each referred to component I.

27. The reaction product of claim 1 wherein I. is a diolefin polymer having a molecular weight up to 15,000.

28. A reaction product as claimed in claim 1 wherein the reaction product also contains formaldehyde being condensed into the reaction product in a separated step the molar ratio of the chemically built-in phenol to that of the built-in formaldehyde being 1:(0.2 to 3.5).

29. A reaction product as claimed in claim 1 wherein the reaction product is modified by at least one radical selected from the group consisting of methylol, methylene ether and methylene groups derived from a separate reaction with formaldehyde.

* * * * *